Aug. 3, 1937.  C. H. WHITE  2,088,676
COTTON PICKER
Filed June 3, 1932   5 Sheets-Sheet 3

WITNESS
Walter Ackerman

INVENTOR
Charles H. White
BY
Brown, Jackson, Boettcher & Dienner
ATTORNEYS

Aug. 3, 1937.  C. H. WHITE  2,088,676
COTTON PICKER
Filed June 3, 1932   5 Sheets-Sheet 4

INVENTOR.
Charles H. White
BY Brown, Jackson
Boettcher & Dienner
ATTORNEYS

WITNESS
Walter Ackerman

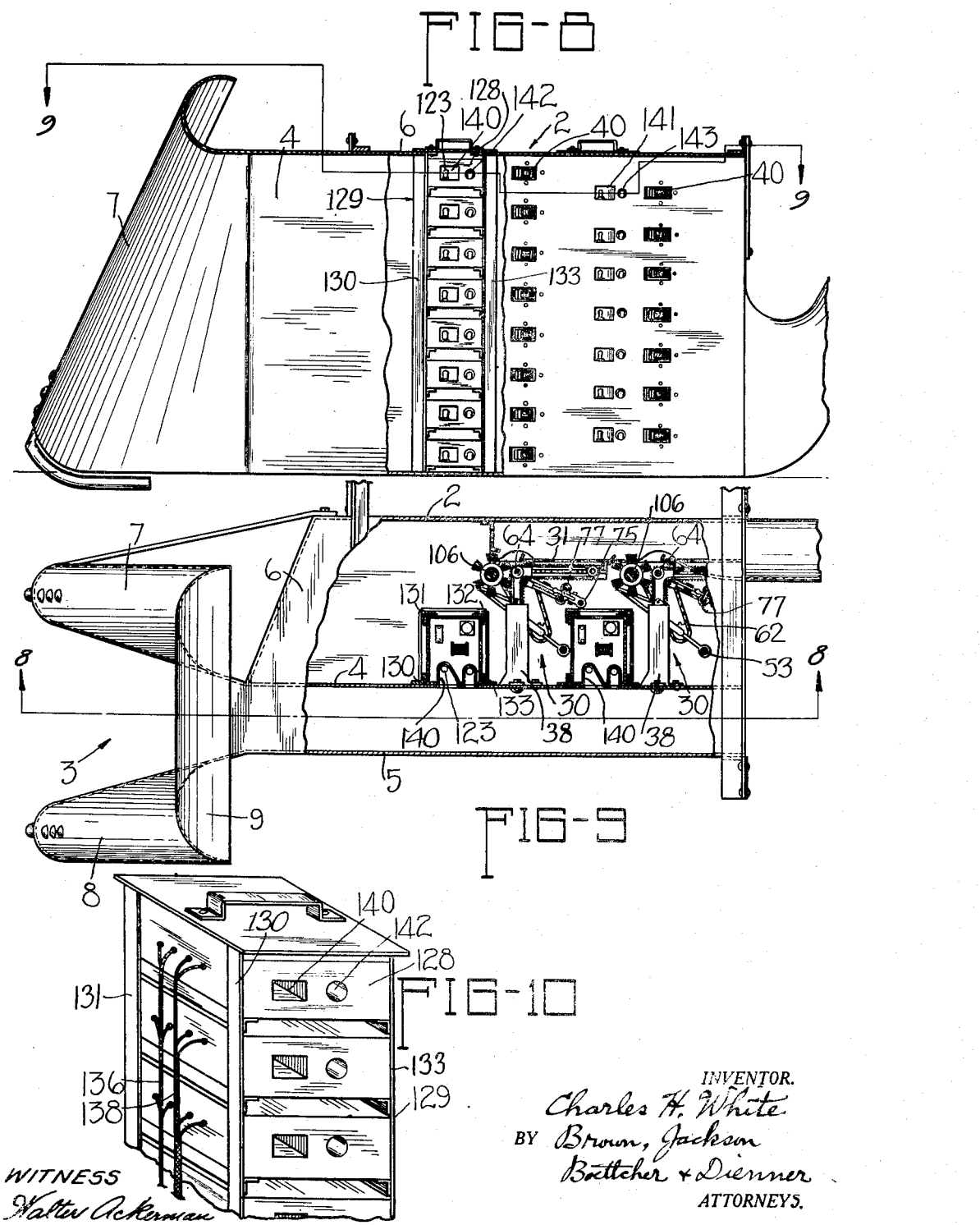

Patented Aug. 3, 1937

2,088,676

UNITED STATES PATENT OFFICE 2,088,676

COTTON PICKER

Charles H. White, Moline, Ill., assignor to Deere & Company, Moline, Ill., a corporation of Illinois Application June 3, 1932, Serial No. 615,126

23 Claims. (Cl. 56—14)

The present invention relates generally to cotton pickers and has for its principal purpose the provision of a machine wherein is embodied one or more picking mechanisms which are individually and normally inoperative but which are adapted to be rendered operative only by the presence of opened bolls of cotton which are ready to be picked.

In some sections of the country the cotton plants vary in height and the bolls ripen at various times. In some instances, in certain sections, when the cotton fields are ready for the first picking some of the plants also contain young tender bolls in various stages of growth. Under such conditions if the opened or ripened bolls are picked by machine the bolls still green are likely to be seriously damaged. It is, therefore, the principal purpose of the present invention to provide a cotton picker which is capable of operating only upon the ripened or opened cotton bolls and which leaves the green and unopened bolls untouched.

More specifically, the present invention contemplates the provision of a cotton picker wherein only a relatively few individually controlled picking mechanisms are provided, each of which is under the control of means responsive to the presence of only opened cotton bolls. Such means may take the form of any sensitive unit which is responsive to some inherent characteristic of an opened boll. Preferably, the present invention utilizes a photo-electric cell which is arranged to be subjected to light reflected from the white cotton of the opened boll. The mechanism for picking or removing the cotton is normally inactive, but when an opened boll of cotton comes within the range of the photo-electric cell the picking mechanism controlled thereby is projected out into the plant to pick that boll of cotton, after which it recedes away from the plant and remains inactive until it is again called into operation.

By virtue of this construction a machine is provided which acts only upon the opened cotton bolls and which does not otherwise contact with or injure the plants in any manner.

Other objects of the present invention include the disposition of the picker units upon a wheeled frame in the form of a tractor having a motor, and actuating the various mechanisms of the picker units by the motor of the tractor. In this connection it is also the purpose of the present invention to provide on the tractor and driven from the motor thereof a source of electrical current for operating the various electrical devices associated with the photo-electric cells or equivalent means responsive to the presence of opened cotton bolls.

These and other objects of the present invention will be apparent from the following detailed description of the preferred embodiment, which is to be taken only as illustrative of the principles of the present invention, shown in the accompanying drawings in which:

Figure 8 is an enlarged view taken along the line 8—8 of Figure 9 and showing the disposition of the plurality of individual picking mechanisms and the associated light responsive control means;

Figure 9 is a sectional view taken along the line 9—9 of Figure 8;

Figure 10 is a fragmentary view illustrating in perspective an assembly of several photo-electric control units and the leads therefor.

Figure 1:
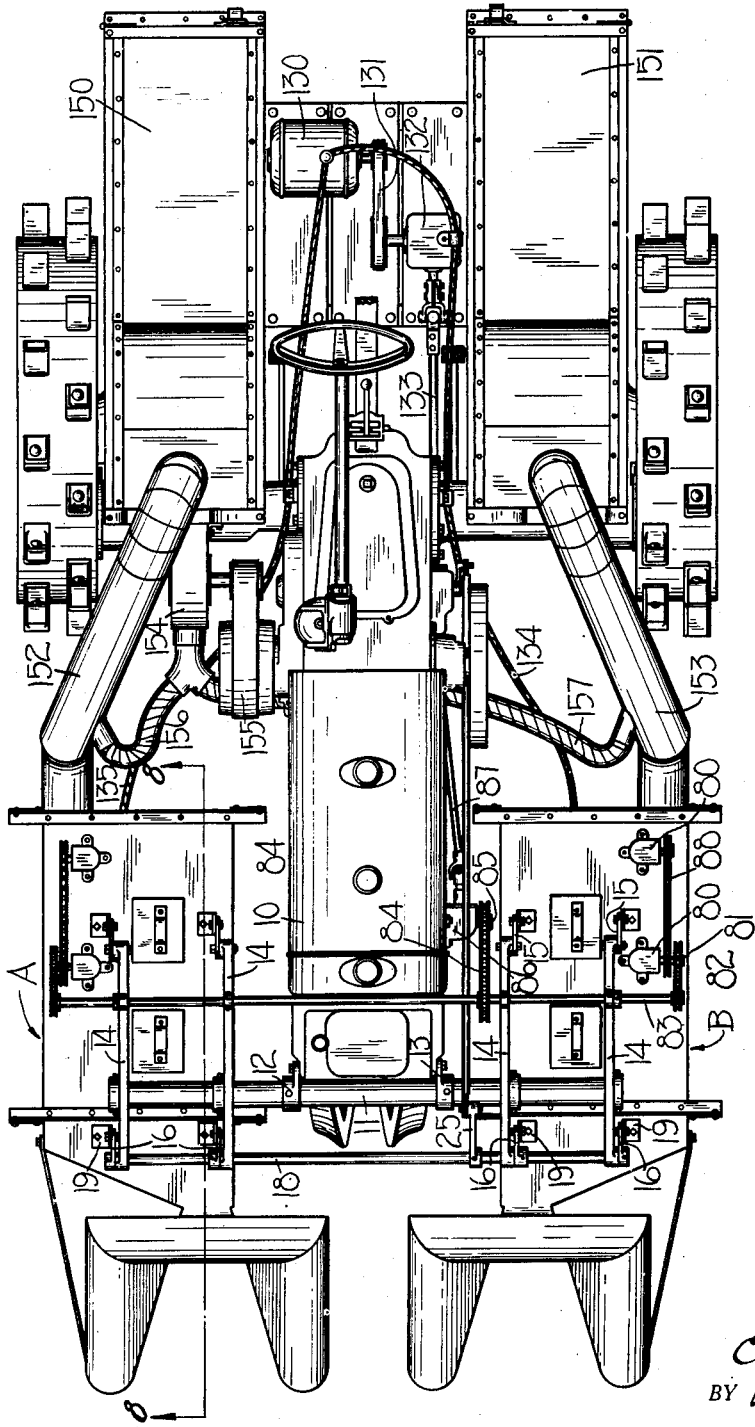
Figure 1 is a plan view of a two-row machine embodying the principles of the present invention.

Referring now more particularly to the drawings, the machine shown is a two-row machine comprising picking units A and B. Each unit comprises a housing 2 and a tunnel 3. Tunnel 3 is formed by the inner wall 4 of the housing 2; and an inner wall 5 spaced therefrom. The top 6 of housing 2 extends inwardly and meets wall 5 to form the top of the tunnel. Walls 4 and 5 and the inward extension of top 6 are flared outwardly as shown at 7, 8 and 9 for the purpose of guiding the plants into the tunnel.

The picking units are supported from the tractor 10 by means of a transverse pipe 11 supported from the front end of the tractor by means of brackets 12 and 13. At each end, pipe 11 is provided with a pair of spaced arms 14, one pair for each picking unit. Each picking unit is supported from its pair of arms 14 through a pair of links 15 and a pair of arms 16. Links 15 are pivotally connected to the rear ends of arms 14 and to brackets 17 fixed to the top of housings 2. Arms 16 are fixed to shaft 18 rockably mounted in bearing openings in the front ends of arms 14. The ends of arms 14 are pivotally connected to brackets 19 provided on the top of housings 2.

Figure 2:
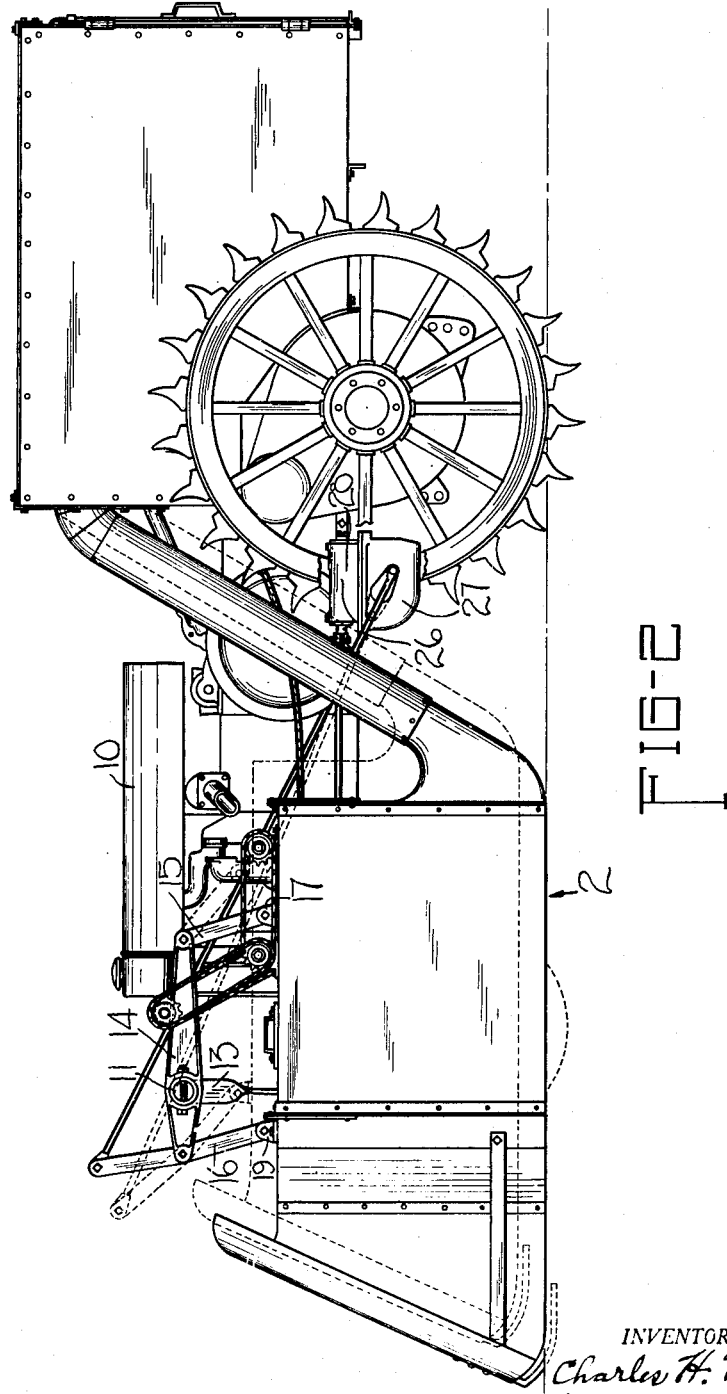
Figure 2 is a side elevation of the machine illustrated in Figure 1.

Shaft 18 is provided with another upwardly extending arm 25 which is link connected by means of link 26 with the power lift 27 which, in turn, is driven from the power take-off mechanism 28 of the tractor. Operating the power lift, causes rotation of shaft 18 and moves the picking units into a transport position as shown in dotted lines in Figure 2.

Each picking unit comprises a plurality of individually controlled picking mechanisms 30. Mounted within the housings 2 these mechanisms are arranged in two vertical rows, there being eight mechanisms in the front row and seven in the rear row, the mechanisms in the rear row being staggered with respect to those in the front row.

Referring now more particularly to Figures 3 to 7 where one of the picking mechanisms is shown in detail, it will be observed that each picking mechanism comprises a carding belt 31 which is looped over a roller 32 journaled on shaft 33 positioned between the top and bottom walls 34 and 35 of a rectangular tube 36. Tube 36 is slidably mounted in a guide 38 which is bolted by means of bolts 39 to the inner side of wall 4 over a rectangular opening 40 therein.

Whenever a cotton boll comes within the range of a picking mechanism, that picking mechanism is projected outwardly to pick that boll by means which is controlled so as to be responsive to the immediate presence of opened bolls of cotton. Preferably, the control means includes a plurality of light sensitive units, as will be described later in detail.

The means for moving the picking mechanism outwardly includes a pair of toggle links 41 and 42 pivoted together at 43. See Figures 3 and 4. The other end of link 42 is journaled on the hub 44 of a gear 45, while the other end of link 41 is pivotally connected at 46 to the rearward extension 47 of the bottom wall of tube 36. A third link 48 is connected to the toggle links at 43 at one end and at its opposite end is pivotally connected at 49 to an arm 50 fixed to a short shaft 51 journaled in bracket 52 supported by the vertically extending rod 53 to which the bracket is keyed. One rotation of shaft 51 through the mechanism described forces tube 36, wherein the carding belt 31 is disposed, outwardly and into the space between the walls 4 and 5 and withdraws it again.

The rotation of shaft 51 is produced through mechanisms which will now be described.

A sprocket 61 is fixed to shaft 51 which is chain connected by means of a chain 62 to a sprocket 63 journaled on the continuously rotating shaft 64. It is held in position on shaft 64 by means of key 65 positioned in the circumferential slot 66 in shaft 64. Sprocket 63 has an elongated hub 67 which has splined engagement with a clutch member 68 which is provided with jaws 69. Jaws 69 may be engaged with companion jaws 69a on the lower face of gear 45. This gear is keyed to shaft 64.

The engagement of the clutch jaws is controlled through a lever 70 which embraces the sleeve 68. A spring 71 is interposed between the lever and the upper flange of sleeve 68. Lever 70 is pivoted at 72 to the arm 73 of the bracket 74 keyed to the vertically extending supporting rod 75. Clutch jaws 69 and 69a are normally disengaged, the lever 70 being held in its downward position by means of the coiled spring 76 disposed in a socket formed in arm 73 and bearing against the under side of lever 70.

Figure 4:
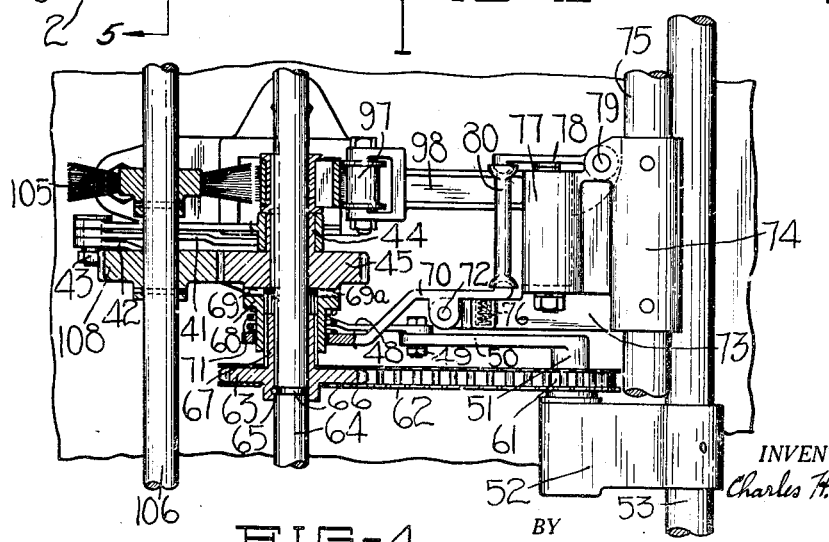
Figure 4 is a vertical section taken along the line 4—4 of Figure 3.
Figure 5:
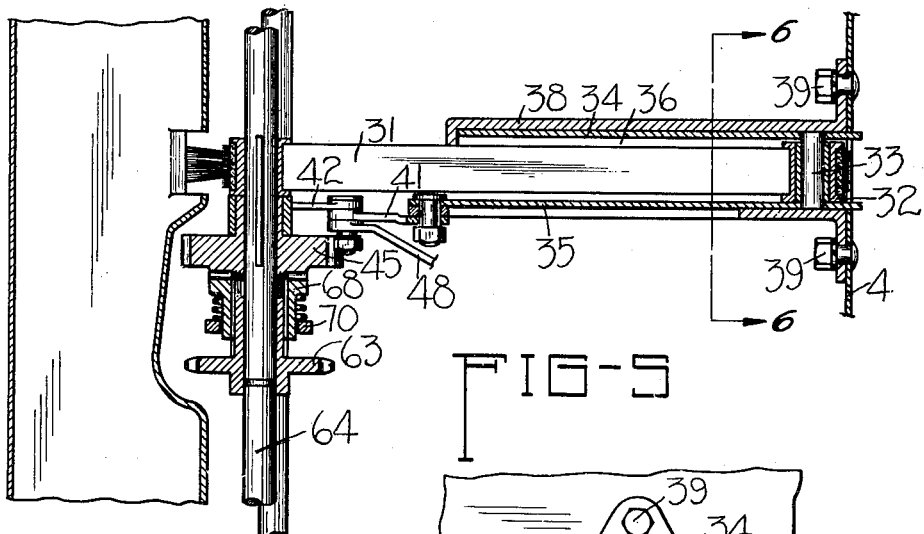
Figure 5 is a section taken along the line 5—5 of Figure 3.
Figure 6:
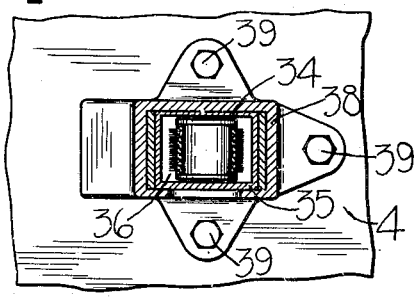
Figure 6 is a cross sectional view taken along the line 6—6 of Figure 3.
Figure 7:
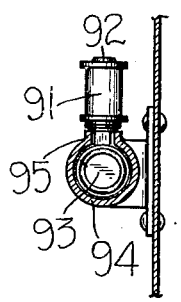
Figure 7 is a cross section taken along the line 7—7 of Figure 3.

The clutch jaws 69 and 69a are engaged through the actuation of a magnet 77 the armature 78 of which is pivoted at 79 to the bracket 74. The free end of the armature 78 has connection with a link 80 which in turn has connection with the rear end of lever 70. In Figure 4 the magnet is shown energized with the clutch jaws 69 and 69a in engagement.

Shaft 64 receives its power from the power take-off 28 on the tractor. It extends through the top 6 of the housing where it is connected by means of a pair of bevel gears housed in housing 80 to a short shaft 81 which is connected by means of the chain and sprocket connection 82 to the transverse drive shaft 83 journaled in bearing openings in brackets 14. Shaft 83 is driven through the chain and sprocket connection 84 with the short shaft 85 which is connected by means of a pair of bevel gears housed in housing 86, the driver of which is connected by means of the drive shaft 87 to the power take-off shaft of the tractor. The two vertical shafts 64 in each housing, there being one such shaft for each vertical row of picking mechanisms, are connected by means of chain and sprocket connection 88.

The carding belt 31 is trained over a pulley 90 fixed on shaft 64 and also over a pulley 91 journaled on a vertically extending spindle 92 fixed to a cylindrical piston 93 slidably positioned in the pipe 94. Spindle 92 projects upwardly through slot 95 extending the length of the pipe. Pipe 94 is supported from the wall of the housing 96 spaced from the outer wall 2. The space between wall 96 and the outer wall forms the cotton receiving chamber. The carding belt 31 is also trained over a pulley 97 journaled between the arms of a forked bracket 98 formed integral with bracket 74.

Figure 3:
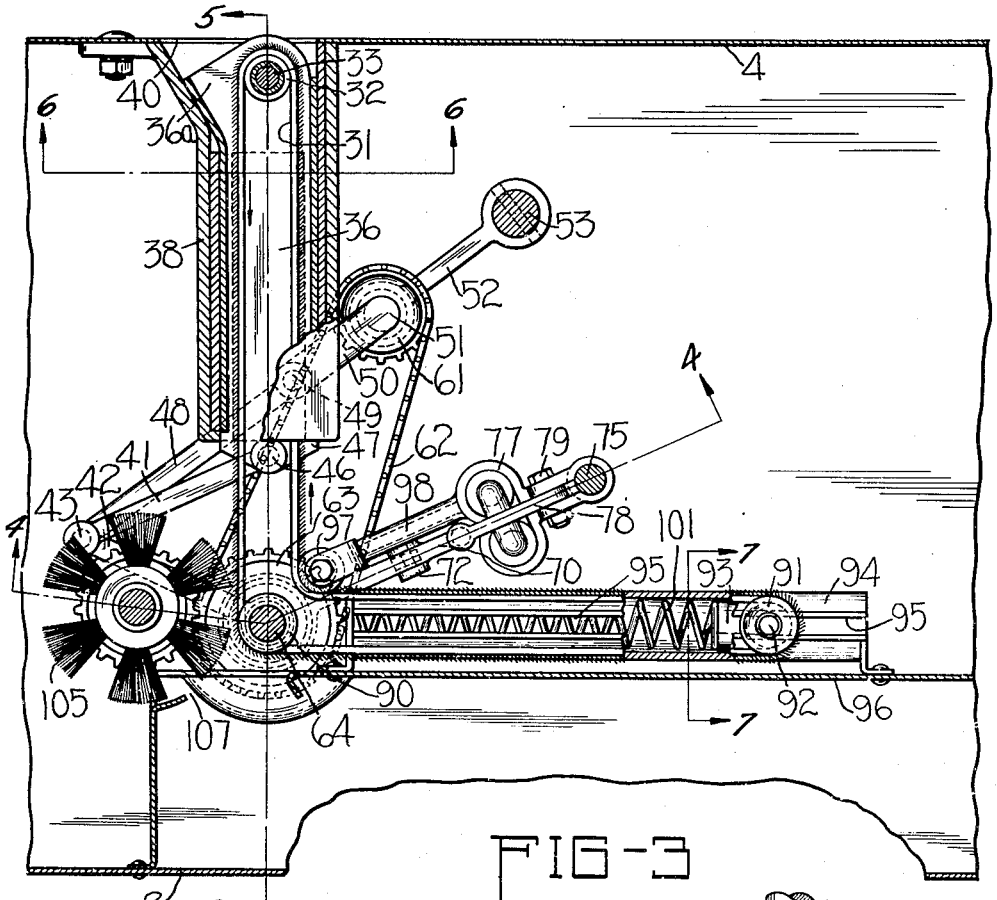
Figure 3 is a horizontal section taken through one of the individual picking mechanisms and illustrating the same in retracted position.

The carding belt 31 is held taut by a spring 101 which bears against the closed end of pipe 94 and against the inner end of the piston 93. When the tube 36 is projected outwardly through the opening 40, piston 93 is pulled towards the closed end of pipe 94, and spring 101 is compressed. As soon as the clutch jaws 69 and 69a are disengaged, regardless of what position the tube 36 has been moved to at that time, the spring 101 immediately acts to retract the tube 36 to its normal retracted position as shown in Figure 3. The carding belt 31 is continuously rotated through its engagement with a pulley 90 which is keyed to shaft 64.

Cotton picked by the carding belt 31 is drawn into the tube 36 through the flared opening 36a thereof and back between it and the wall of the tube. It is removed from the carding belt by means of a high speed continuously operating brush 105. Brush 105 is fixed to the continuously rotating vertical shaft 106. The outer periphery of the brush 105 brushes the barbs of the carding belt 31. Its peripheral velocity is greater than that of the carding belt. Adjacent each carding belt an opening 107 is provided in the wall 96, this opening entering into the cotton receiving chamber. The brush 105 in removing the cotton from the carding belt brushes it through the opening 107 into the cotton receiving chamber.

Shaft 106 is rotated through a gear 108 keyed to the shaft and meshing with gear 45. Only one set of gears 108 and 45 need be provided for each pair of shafts 106 and 64. Therefore, for all picking mechanisms in each vertical row except one, gears 108 and 45 are omitted. For such picking mechanisms clutch jaws 69a are provided on the bottom face of the flanged sleeve keyed to shaft 64.

Figure 11:
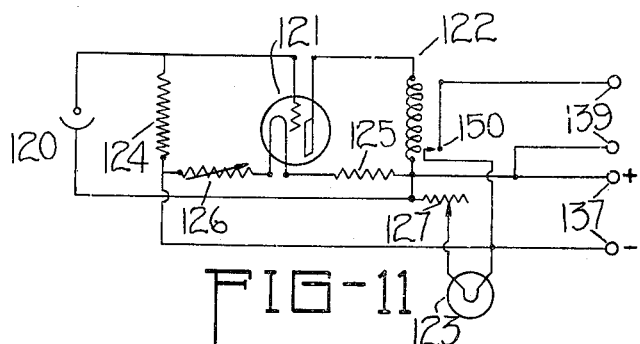
Figure 11 is a diagram showing the control circuit and the photo-electric cell incorporated therein.

For the control of each picking mechanism, a separate control unit is provided, as mentioned above. This unit comprises the apparatus diagrammatically shown in Figure 11. This includes photo-electric cell 120, an amplifying tube 121, a relay 122, an ordinary red light 123, and fixed resistances 124 and 125 and variable resistances 126 and 127 connected in the manner shown in Figure 11. This mechanism is mounted in the small boxes 128, the several boxes in each vertical row being slidably positioned in a frame work 129 which is supported in the housings between the angle irons 130, 131, 132 and 133. The control assembly, including one series of control units, can be removed by pulling same upwardly through openings in the top of the picker housings. See Figures 1, 2 and 10.

Each box 128 is provided with an opening 140 which aligns with an opening 141 in the wall 4 of the picker housing and red light emanating through this opening gives the white opened cotton bolls a red color and the rest of the plant including the leaves and stalk and any green bolls appear black. Another opening 142 is provided in each box 128 which aligns with holes 143 in the side 4 of the picker housing. The photo-cells 120 are mounted in front of these openings.

In the operation of the device, red light rays reflected from the cotton bolls through openings 142 impinge upon the photo-cell 120 which raises the potential on the grid of the amplifying tube 121. This causes an increased flow of current in the coil of relay 122 causing it to close its contacts 150. The closure of contacts 150 completes a circuit with the magnet 77 causing it to be energized which, as previously explained, results in the projection of the picking mechanism out through the opening 40. As soon as the cotton boll is removed from the plant and red light is no longer reflected therefrom to the photo-cell, relay 122 deenergizes sufficiently to open its contacts 150. This breaks the circuit for the magnet 77 causing a disengagement of clutch jaws 69 and 69a. Immediately thereupon spring 101 acts to return the picking mechanism to its normal retracted position.

The control units are energized by 110 volt direct current provided by the generator 130 mounted at the rear end of the tractor and driven through the belt connection 131 and a pair of bevel gears mounted in housing 132, the drive of which is connected by means of a shaft 133 with the regular power take-off shaft of the tractor. Cables 134 and 135 are the leads from the generator to the control apparatus. In Figure 10 cables 136 are the leads from the generator to terminals 137 of each control circuit and the cables 138 are the leads from the terminals 139 to the individual magnets for the individual picking mechanisms.

Two cotton receiving hoppers 150 and 151 are provided at the rear end of the tractor. Cotton is delivered thereto from the cotton receiving chambers through the pipes 152 and 153 through an induced draft provided from the fan 154 having belt connection 155 with the belt pulley of the tractor. Fan 154 is connected with the pipes 152 and 153 through tube connections 156 and 157, these leading into the pipes at the proper angle to induce the draft in the direction of the delivery end of the pipes.

It will thus be seen from the above that I have provided a cotton picker which is adapted to remove only the opened cotton bolls which are ripe, the cotton plant and any unopened bolls being otherwise not touched or injured in any way, in connection with suitable means for conveying and receiving the cotton so picked, all of the operating mechanism being actuated by the motor of the tractor.

While I have thus described above the preferred structural embodiment, it will be apparent to those skilled in the art that my invention is not to be limited to the specific detailed construction illustrated, but that, in fact, widely different means may be employed in the practice of the broader aspects of my invention.

What I claim, therefore, and desire to secure by Letters Patent is:

1. A harvester comprising a normally inoperative harvesting mechanism, means for moving said mechanism into plant engaging relation, and light sensitive means responsive to the reflection of light from a crop in condition to be harvested for initiating the operation of said harvesting mechanism.

2. A cotton picker including normally inoperative mechanisms, means for moving said mechanisms into plant engaging position, said means including a control device responsive to the reflected light from unobscured cotton within the range of the picking mechanism.

3. A cotton picker including a plurality of picking devices normally in a retracted position, and means for each device for projecting the device into a cotton plant, said means including a control device responsive to the reflected light from unobscured cotton within the range of the picking device.

4. A harvester comprising row following means, a harvesting unit movably supported thereby and adapted to be shifted into and out of plant engaging position, means tending to hold said unit out of operative plant engaging position, and means responsive to light reflected from the fruit of the plants for shifting said harvesting unit into operative position.

5. A cotton picker comprising row following means, a picking unit carried by said means and including normally inoperative picking mechanism, and control mechanism for moving said picking mechanism into plant engaging position, said control mechanism comprising light sensitive means responsive to light reflected from opened cotton bolls.

6. A cotton picker comprising row following means, a picker unit mounted on said means and including picking mechanism shiftable into and out of operative plant engaging position, means for shifting said picking mechanism into operative position, and means for initiating the operation of said last mentioned means including a light sensitive means responsive to the reflection of light from the opened bolls, whereby said picking mechanism is shifted into operative position only in the presence of cotton to be picked.

7. A cotton picker including row following means, normally inoperative picking means carried thereby and including a picking unit shiftable into and out of operative position, means for shifting said unit into operative position, and means for controlling said last mentioned means including means for projecting light rays upon the cotton plants and means responsive to the reflection of said rays from the opened cotton bolls.

8. A cotton picker comprising row following means, a picker unit carried thereby and including a longitudinally disposed tunnel adapted to be moved along the plant row, picking mechanism associated therewith and including picking means shiftably mounted for movement into and out of operative position in said tunnel, and control means therefor including a source of light and light sensitive means responsive to light reflected from the opened cotton bolls for shifting the picking means into operative position.

9. A cotton picker comprising row following means, a longitudinally disposed tunnel carried thereby and including a pair of transversely spaced walls, picking means associated with said tunnel and arranged at one side thereof, said mechanism including transversely shiftable picking mechanism movable into and out of the space between said walls, a source of light for illuminating the cotton plants as they pass between said walls, and means responsive to the presence of light reflected from opened cotton bolls between said walls for shifting the picking mechanism into operative position.

10. A harvester comprising, in combination, a tractor having a motor, a harvesting unit supported by the tractor and including row following means, normally inoperative harvesting mechanism carried by said row following means, means for driving said mechanism from the motor of the tractor, and means responsive to the light reflected from the crop in condition to be harvested for initiating the operation of said mechanism from said driving means.

11. A cotton picker comprising, in combination, a tractor having a motor, a plurality of picker units supported by the tractor, each unit including row following means and picking mechanism shiftable into and out of position to engage the plants of the rows, and control means for said picker unit including means sensitive to the light reflected from opened cotton bolls and activated by the power of the motor of the tractor and means controlled by said sensitive means for shifting said picking mechanism into operative position whenever an opened cotton boll comes within the operative range of said sensitive means.

12. A cotton picker comprising, in combination, a tractor having a motor, a plurality of picker units supported by the tractor, each unit including row following means and picking mechanism shiftable into and out of position to engage the plants of the rows, and control means for said picker unit including means to generate electricity carried by the tractor and driven from the motor thereof, a light sensitive cell actuated by said source of electricity, said cell being disposed to be responsive to the light reflected from opened cotton bolls, and means controlled by said cell for shifting the picker mechanism into operative position.

13. A cotton picker comprising, in combination, a tractor having a motor, a plurality of picker units supported by the tractor, each unit including row following means and picking mechanism shiftable into and out of position to engage the plants of the rows, and control means for said picker unit including means to generate electricity carried by the tractor and driven from the motor thereof, a light sensitive cell actuated by said source of electricity, said cell being disposed to be responsive to the light reflected from opened cotton bolls, magnetic means energized when light falls on said photo-electric cell, and means actuated by said magnetic means for shifting the picker mechanism into operative position.

14. A harvester comprising, in combination, a wheeled supporting frame, a plurality of harvesting units supported thereby, each of said units including a series of vertically spaced individual harvesting mechanisms movable into and out of operative plant engaging position, power operated means for operating said mechanisms, and control mechanism including light sensitive means responsive to light reflected from the crop in condition to be harvested for moving the associated individual harvesting mechanism into operative position.

15. A harvester comprising, in combination, a wheeled supporting frame, a plurality of harvesting units supported thereby, each of said units including a series of vertically spaced individual harvesting mechanisms movable into and out of operative plant engaging position, power operated means for operating said mechanisms, and control means including a light sensitive cell for each of said individual harvesting mechanisms responsive to light reflected from the crop in condition to be harvested for moving the associated individual harvesting mechanism into operative position.

16. A cotton picker comprising, in combination, a wheeled supporting frame, a picker unit carried thereby and including row following means, a plurality of individual picking mechanisms carried by said means and including a shiftable picker member movable into and out of operative plant engaging position, means responsive to light rays reflected from opened cotton bolls in the immediate vicinity of each of the individual picking mechanisms for projecting the associated picker member into operative position to pick the opened bolls, stripper means for removing the picked cotton, and means carried by the tractor for raising the picker unit out of operative position.

17. A cotton picker comprising, in combination, a supporting frame, a picker unit carried thereby, said picker unit including a plurality of individual picking mechanisms each including a member normally disposed in inoperative position and shiftable into operative position to pick cotton from adjacent plants, a constantly driven member for shifting said picking member into operative position, magnetic means for connecting said members whereby said individual picking mechanism is rendered operative, and means for controlling said magnetic means including a photo-electric cell responsive to the presence of open cotton only and a relay associated therewith for energizing said magnetic means.

18. A harvester comprising a plurality of individually operative gathering mechanisms, each mechanism being effective through a certain path, a device individual to each mechanism for controlling the operation thereof, and means responsive to light reflected from the unobscured product in condition to be gathered in one of said paths for initiating the operation of the control device individual to the gathering mechanism in whose path said product appears.

19. A cotton harvester comprising a normally inoperative harvesting mechanism, means for effecting the operation of said mechanism, and light sensitive means responsive to the reflection of light from a cotton crop in condition to be harvested for initiating the operation of said harvesting mechanism.

20. A cotton harvester having means to pick cotton from a cotton plant, in combination, a source of light and a photo-electric cell connected in circuit with the cotton picking means, said photo-electric cell being actuated by light reflected from ripened cotton, and initiating an operation of said cotton picking means.

21. In a cotton harvester including means to traverse a cotton plant and means to detach matured cotton from the bolls of the cotton plant, in combination, a source of light and photo-responsive means selectively responsive to light reflected from matured cotton, means to connect said photo-responsive means with the detaching means to initiate an operation of said detaching means.

22. In a cotton harvester machine having ground wheels and a casing, which machine is adapted to straddle and traverse a row of cotton plants, a shielded enclosure within the body of the machine, normally inoperative means to pick cotton from cotton plants, a source of light within the enclosure and means within the enclosure and responsive to light reflected from exposed cotton on the plant to initiate the operation of said picking means.

23. A cotton harvester comprising a machine adapted to straddle and traverse a row of cotton plants, normally inoperative means mounted on the machine to remove cotton from the bolls of the plants straddled, means to deflect the cotton plants into close proximity to said removing means, a source of light illuminating the cotton plants, and photo-responsive means actuated by light reflected from matured cotton to initiate the operation of said cotton removing means.

CHARLES H. WHITE.